(12) United States Patent
Judd

(10) Patent No.: US 8,146,342 B2
(45) Date of Patent: Apr. 3, 2012

(54) EXHAUST EDUCTOR SYSTEM WITH A RECIRCULATION BAFFLE

(75) Inventor: Z. Daniel Judd, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/018,931

(22) Filed: Feb. 1, 2011

(65) Prior Publication Data

US 2011/0188989 A1 Aug. 4, 2011

Related U.S. Application Data

(62) Division of application No. 11/590,063, filed on Oct. 31, 2006, now Pat. No. 7,966,825.

(51) Int. Cl.
*F02C 7/08* (2006.01)
*F02G 1/00* (2006.01)
*F02G 3/00* (2006.01)

(52) U.S. Cl. ............... 60/39.5; 60/770; 417/182

(58) Field of Classification Search ............ 60/770, 60/269, 39.83, 39.5, 262, 264; 244/58; 181/213; 417/159, 182, 194
See application file for complete search history.

(56) References Cited

U.S. PATENT DOCUMENTS

| 1,137,767 A * | 5/1915 | Leblanc ............ 417/182 |
| 3,241,316 A * | 3/1966 | Endres ............... 60/39.5 |
| 3,521,452 A | 7/1970 | Longwell |
| 3,631,672 A | 1/1972 | Gentile |
| 4,288,984 A | 9/1981 | Bhat et al. |
| 4,566,270 A | 1/1986 | Ballard et al. |
| 5,265,408 A | 11/1993 | Sheoran et al. |
| 5,325,661 A | 7/1994 | Rice |
| 5,761,899 A | 6/1998 | Klees |
| 5,951,246 A | 9/1999 | Uematsu et al. |
| 6,253,540 B1 | 7/2001 | Chew et al. |
| 6,415,598 B2 | 7/2002 | Pinker |
| 6,615,576 B2 | 9/2003 | Sheoran et al. |
| 6,942,181 B2 | 9/2005 | Dionne |
| 7,017,332 B2 | 3/2006 | Oishi |
| 2002/0139120 A1 | 10/2002 | Sheoran et al. |
| 2005/0262826 A1 | 12/2005 | Anderson |
| 2005/0268593 A1 | 12/2005 | Hagshenas |
| 2005/0274117 A1 | 12/2005 | Sheoran et al. |
| 2006/0059891 A1 | 3/2006 | Sheoran et al. |

* cited by examiner

*Primary Examiner* — Ehud Gartenberg
*Assistant Examiner* — Andrew Nguyen
(74) *Attorney, Agent, or Firm* — Ingrassia Fisher & Lorenz, P.C.

(57) ABSTRACT

An exhaust eductor system includes a primary exhaust nozzle configured to transport an active flow stream; and a mixing duct at least partially surrounding the primary exhaust nozzle and configured to transport a passive flow stream that is entrained by mixing with the active flow stream from the primary exhaust nozzle. The mixing duct has an interior, and a baffle on the interior of the mixing duct is configured to prevent the mixed flow streams from exiting the mixing duct.

17 Claims, 2 Drawing Sheets

EXHAUST EDUCTOR SYSTEM WITH A RECIRCULATION BAFFLE

PRIORITY CLAIM

This application is a divisional of U.S. application Ser. No. 11/590,063, filed Oct. 31, 2006.

FIELD OF THE INVENTION

The present invention generally relates to an exhaust eductor system, particularly to an exhaust eductor system for an auxiliary power unit.

BACKGROUND OF THE INVENTION

Many modern aircraft are equipped with an airborne auxiliary power unit ("APU") that generates and provides electrical and pneumatic power to various parts of the aircraft for such tasks as environmental control, lighting, powering electronics, and main engine starting. It is known that cooling the APU oil and engine externals increases APU system reliability. Some systems use cooling fans to accomplish this; however, cooling fans increase costs, weight, and contribute to the noise levels around the APU. Exhaust eductors are increasingly being used in APU gas turbine applications to cool, for example, APU compartment air, and/or gearbox and generator oil. Exhaust eductors generally include a primary exhaust nozzle configured to transport an active flow stream of the APU. A mixing duct at least partially surrounds the primary exhaust nozzle and transports a passive flow stream that is entrained by mixing with the active flow stream from the primary exhaust nozzle. The entrained passive flow stream flows through and cools the APU.

The mixed passive and active flow streams can become turbulent in the mixing duct and create eddies that recirculate back into the APU compartment. This results in inefficiencies, and can result in a failure of the exhaust eductor system to cool the APU. Temperatures at the inlet of the mixing duct can reach temperatures as high as 400-700° F. This is particularly a problem when the active flow stream is at an angle relative to the mixing duct.

Accordingly, there is a need for an exhaust eductor system that prevents recirculation of the mixed active and passive flow streams in the mixing duct. Furthermore, other desirable features and characteristics of the present invention will become apparent from the subsequent detailed description and the appended claims, taken in conjunction with the accompanying drawings and the foregoing technical field and background

BRIEF SUMMARY OF THE INVENTION

An exhaust eductor system includes a primary exhaust nozzle configured to transport an active flow stream; and a mixing duct at least partially surrounding the primary exhaust nozzle and configured to transport a passive flow stream that is entrained by mixing with the active flow stream from the primary exhaust nozzle. The mixing duct has an interior, and a baffle is on the interior of the mixing duct and configured to prevent the mixed flow streams from exiting the mixing duct back into the APU compartment.

A method is provided for cooling an auxiliary power unit (APU) compartment. The method includes entraining and mixing a passive flow stream with an active flow stream from a primary exhaust nozzle in a mixing duct at least partially surrounding the primary exhaust nozzle; and preventing the mixed flow streams from exiting the mixing duct back into the APU compartment with a baffle on an interior of the mixing duct.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
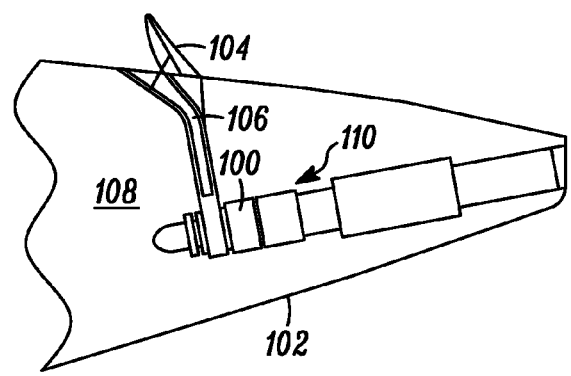
FIG. 1 shows one embodiment of an auxiliary power unit ("APU") with an exhaust eductor system installed in an APU compartment in the tailcone of an aircraft.

The present invention is directed to a simple, low cost exhaust eductor system for use with an auxiliary power unit ("APU"). FIG. 1 shows one embodiment of an APU 100 with an exhaust eductor system 110 installed in an APU compartment 108 in the tailcone 102 of an aircraft. Attached to the APU 100 is an APU inlet duct 104 that provides combustion and bleed air to the APU 100, an APU compartment air inlet duct 106 that provides cooling air to the APU compartment 108, and the exhaust eductor system 110 that provides APU compartment 108 ventilation.

Figure 2:
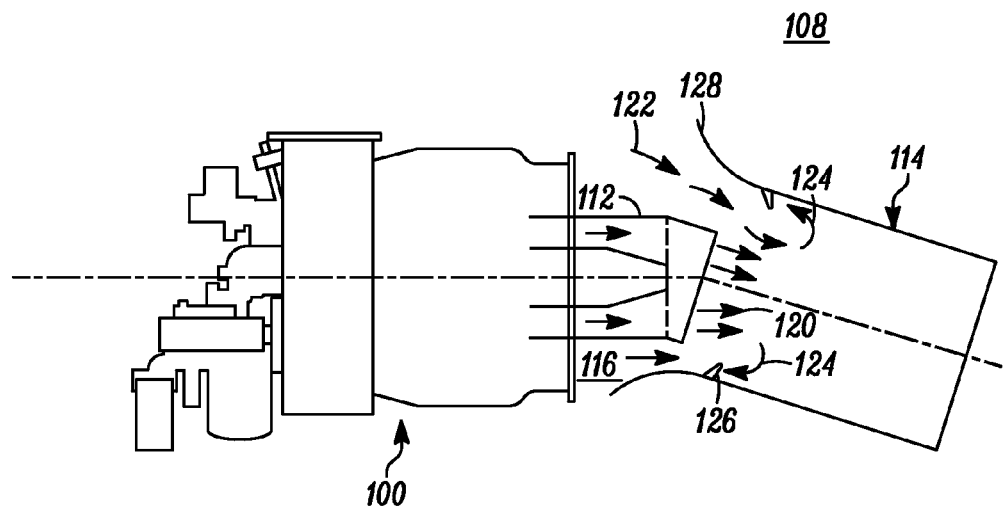
FIG. 2 shows a partial, cross sectional view of one embodiment of the exhaust eductor system of FIG. 1.

FIG. 2 shows a partial, cross sectional view of one embodiment of the exhaust eductor system 110 that includes a primary exhaust nozzle 112 and a mixing duct 114. In the depicted embodiment, the primary exhaust nozzle 112 extends partially within the mixing duct 114. An eductor plenum (not shown) can be provided to enclose the mixing duct 114 and the primary exhaust nozzle 112, but has been removed from FIG. 2 for clarity. The mixing duct 114 can have a bellmouth 128 on one end.

The primary exhaust nozzle 112 is configured to carry an active flow stream 120 (also referred to as a "primary exhaust flow stream") from the APU 100. A vacuum passage 116 is formed between the primary exhaust nozzle 112 and the eductor plenum. One end of the vacuum passage 116 is in communication with the mixing duct 114. The primary exhaust nozzle 112 is configured to force the active flow stream 120 into the mixing duct 114, which provides eductor pumping to draw a passive flow stream 122 through the vacuum passage 116. The passive flow stream 122 is pulled from the APU compartment 108 and cools the APU compartment 108, as well as gearbox and generator oil that flows through a non-illustrated oil cooler.

Figure 3:
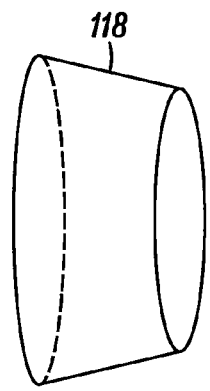
FIG. 3 shows a perspective view of one embodiment of a baffle utilized in the exhaust eductor system of FIG. 2.

The exhaust eductor system 110 can further include a baffle 118 on the interior of the mixing duct 114. FIG. 2 illustrates the baffle 118 installed in the exhaust eductor system 110, and FIG. 3 illustrates a closer perspective view of the baffle 118. Arrows 124 in FIG. 2 indicate the mixed flow streams of the active flow stream 120 and the passive flow stream 122 in the mixing duct 114. The mixed flow streams 124 can become turbulent in the mixing duct 114. In conventional exhaust eductor systems, the mixed flow streams 124 can recirculate out of the mixing duct 114 and back into APU compartment 108. The baffle 118 prevents the mixed flow streams 124 from recirculating back into the APU compartment 108.

The baffle 118 is any obstruction or structure that can divert, deflect, block, check, or trap the flow streams 120, 122, 124. However, in the depicted embodiment, the baffle 118 is annular and extends at an angle from the interior of the mixing duct 114 in the direction of the active flow stream 120. The baffle 118 can be particularly useful in an exhaust eductor system 110 in which the active flow stream 120 is non-parallel to the central axis of the mixing duct 114, such as that shown in FIG. 2. In the embodiment of FIG. 2, the primary exhaust nozzle 112 is generally offset with respect to the mixing duct 114. Even though the primary exhaust nozzle 112 can have a bend at the end to better align the primary exhaust nozzle 112 with the mixing duct 114, the active flow stream 120 still tends to exit the primary exhaust nozzle 112 at an angle relative to the mixing duct 114, which as noted above contributes to turbulence in the mixed flow streams 124.

In one embodiment, the baffle 118 extends from the interior of the mixing duct 114 at an angle of less than or equal to 45°, such as 30°. In other embodiments, the angle of the baffle 118 relative to the mixing duct 114 can be less than or equal to 90°. The angle of the baffle 118 can be adjusted to prevent recirculation of the mixed flow stream 124 while minimizing or preventing an impact on the mixing of the active flow stream 120 and the passive flow stream 122. The length of the baffle 118 may vary, but in a particular embodiment, the baffle 118 has a length of about 1.3 inches. The baffle 118 can be located adjacent the tangency point 126 of the bellmouth 128 on the end of the mixing duct 114. In alternate embodiments, the baffle 118 can be within 1.9 inches of the tangency point, for example, within 0.5 inches. The baffle 118 can have an inside diameter of, for example, 7.6 inches. The baffle 118 can be mounted on the mixing duct 114 by mechanisms such as welding, riveting, or bolt flange, or be integral with the mixing duct 114.

In one embodiment, the length, diameter, position, and angle of the baffle 118 can be determined by modeling the eductor system 110 with computer fluid dynamics (CFD) and observing the mixed flow stream 124. Generally, the baffle 118 is sized and positioned such that the baffle 118 prevents or reduces recirculation of the mixed flow stream 124 back into the APU compartment 108 while not unduly affecting the transition of the primary flow stream 120 and the passive flow stream 122 into the mixing duct 114. In one embodiment, CFD models an eductor system 110 without the baffle 118 to determine the positions recirculation eddies of the mixed flow stream 124. The baffle 118 can be sized and positioned such that the inner diameter is in the center of the recirculation eddies.

The baffle 118 can reduce the temperatures of the APU compartment 108, particularly in areas adjacent the inlet of the mixing duct 114. For example, the baffle 118 can lower the temperature in areas adjacent the inlet of the mixing duct 114 from about 400-700° F. to about 170-200° F.

Figure 4:
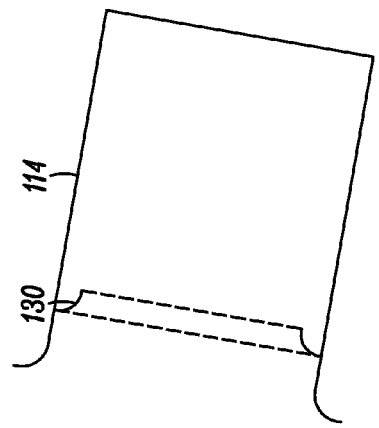
FIG. 4 shows a cross sectional view of the baffle utilized in the exhaust eductor system of FIG. 2.
Figure 7:
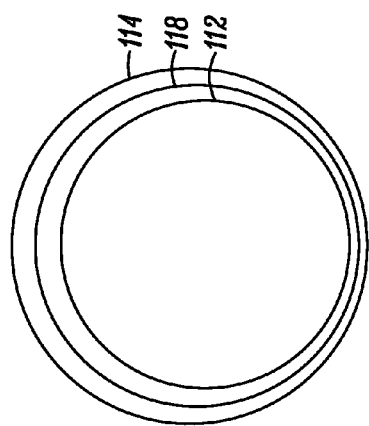
FIG. 7 shows a cross sectional view of an alternative embodiment of the baffle utilized in the exhaust eductor system of FIG. 2.
Figure 5:
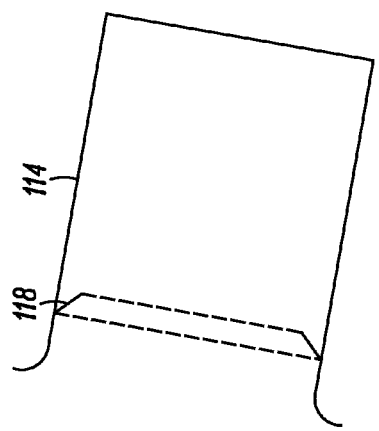
FIG. 5 shows a cross sectional view of an alternative embodiment of the baffle utilized in the exhaust eductor system of FIG. 2.
Figure 6:
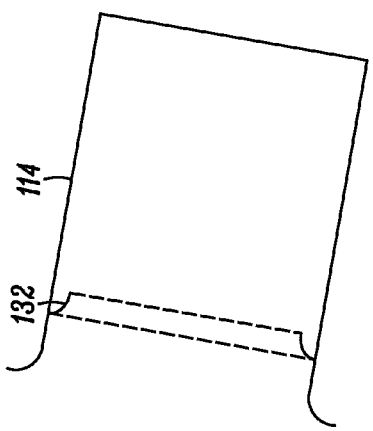
FIG. 6 shows a cross sectional view of an alternative embodiment of the baffle utilized in the exhaust eductor system of FIG. 2.

As shown in the cross-sectional view of FIG. 4, as well as the views of FIGS. 2 and 3, the baffle 118 can have straight edges. FIG. 5 illustrates an alternative baffle 130 with rounded, circular edges, and FIG. 6 illustrates an alternative baffle 132 with rounded, elliptical edges. As shown, for example, in FIG. 2, the end of the primary exhaust nozzle 112, the mixing duct 114 and the baffle 118 can be axisymmetric or coaxial with respect to one another. In an alternative embodiment, as shown in the cross-sectional view of FIG. 7, the baffle 118 can be non-axisymmetric with respect to the mixing duct 114 and the primary exhaust nozzle 112.

The primary exhaust nozzle 112 and mixing duct 114 of the eductor exhaust system 110 may each have many cross-sectional shapes, including rectangle, circular, elliptical, racetrack, star, etc. Moreover, the nozzle 112 and exhaust duct 114 can include tabs or other shapes on one end to enhance eduction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An auxiliary power unit of an aircraft, comprising:
   an exhaust eductor system in a compartment of the auxiliary power unit,
   a primary exhaust nozzle configured to transport an active flow stream, the primary exhaust nozzle terminating with a nozzle end;
   a mixing duct at least partially surrounding the primary exhaust nozzle and configured to transport a passive flow stream that is entrained by mixing with the active flow stream from the primary exhaust nozzle, the mixing duct having an interior; and
   a baffle on the interior of the mixing duct, the baffle having an upstream end that is downstream of the nozzle end, and configured to prevent the mixed flow streams from exiting the mixing duct back into the auxiliary power unit compartment, wherein the upstream end is attached to the mixing duct and terminates at a downstream end, wherein the baffle has a cross-section through a radial-axial plane with a curvature extending from the upstream end to the downstream end that is generally circular or generally elliptical.

2. The exhaust eductor system of claim 1, wherein the baffle is annular.

3. The exhaust eductor system of claim 1, wherein the baffle extends from the interior of the mixing duct in a direction of the active flow stream.

4. The exhaust eductor system of claim 1, wherein the mixing duct has a bellmouth and the baffle is on or adjacent the bellmouth.

5. The exhaust eductor system of claim 1, wherein the baffle extends from the interior of the mixing duct at an angle less than or equal to 90°.

6. The exhaust eductor system of claim 1, wherein the baffle extends from the interior of the mixing duct at an angle less than or equal to 45°.

7. The exhaust eductor system of claim 1, wherein the baffle extends from the interior of the mixing duct at an angle of approximately 30°.

8. The exhaust eductor system of claim 1, wherein the baffle is axisymmetric relative to the primary exhaust nozzle and the mixing duct.

9. The exhaust eductor system of claim 1, wherein the baffle is non-axisymmetric relative to the primary exhaust nozzle and the mixing duct.

10. The exhaust eductor system of claim 1, wherein the mixing duct has a center axis that is non-parallel to the active flow stream.

11. The exhaust eductor system of claim 1, wherein the active flow stream is a primary exhaust flow stream from an auxiliary power unit (APU).

12. The exhaust eductor system of claim 1, wherein the passive flow stream provides cooling to the auxiliary power unit (APU) compartment.

13. A method for cooling an auxiliary power unit (APU) compartment of an aircraft, comprising:

entraining and mixing a passive flow stream with an active flow stream from a primary exhaust nozzle in a mixing duct at least partially surrounding the primary exhaust nozzle; and preventing the mixed flow streams from exiting the mixing duct back into the auxiliary power unit (APU) compartment with a baffle on an interior of the mixing duct at a location downstream of a nozzle end of the primary exhaust nozzle, wherein the preventing step includes blocking the mixed flow streams with the baffle, and wherein the baffle has an upstream end attached to the mixing duct and terminates at a downstream end, wherein the upstream end is downstream of the nozzle end, and wherein the baffle has a cross-section through a radial-axial plane with a curvature extending from the upstream end to the downstream end that is generally circular or generally elliptical.

14. The method of claim 13, wherein the baffle is annular.

15. The method of claim 13, wherein the baffle extends from the interior of the mixing duct in a direction of the active flow stream.

16. The method of claim 13, wherein the mixing duct has a bellmouth and the baffle is on or adjacent the bellmouth.

17. The method of claim 13, wherein the baffle extends from the interior of the mixing duct at an angle less than or equal to 90°.

* * * * *